Patented June 3, 1952

2,599,436

UNITED STATES PATENT OFFICE 2,599,436

SALT BLOCK

William B. Dancy, East Point, Ga., assignor to International Minerals & Chemical Corporation, a corporation of New York No Drawing. Application August 15, 1950,
Serial No. 179,649

6 Claims. (Cl. 99—2)

This invention relates to the preparation of salt blocks, and more particularly to the preparation of animal salt blocks containing a binder.

Salt blocks are conventionally made by compressing salt under a pressure of about ten tons per square inch. The blocks are firm, compact masses of any desired size or shape and which are readily handled. They are usually prepared so as to weigh about 50 pounds. These salt blocks are placed at convenient points as salt licks for cattle and for other animals. Salt in blocks is the preferred form for feeding animals in that large amounts of salt are wasted when it is fed to animals in loose form. However, it would be desirable to bind salt into blocks rather than compress the salt under high pressure.

It is an object of the instant invention to bind salt into blocks which are suitable for animal consumption.

It is a further object of the instant invention to provide a process for binding salt into blocks suitable for animal consumption.

These objects and other objects of the instant invention will become apparent upon a fuller understanding of the invention as hereinafter set forth.

It has been discovered that a small amount of magnesium oxychloride binds salt, while being molded, into block form. Blocks of varying hardness and durability are prepared by varying the ratio of salt to magnesium oxychloride. Magnesium oxychloride is incorporated into the salt in an amount at least sufficient to bind the salt into block form.

As used herein in the description and claims, the term "salt" means common salt, i. e., sodium chloride.

In one embodiment, the magnesium oxychloride binder is formed in situ by adding magnesium oxide to the salt and treating this mixture with an aqueous magnesium chloride solution. In practicing the invention, 100 parts by weight of salt are mixed with between about 1.25 and about 5.0 preferably between about 1.25 and about 1.50, parts by weight of magnesium oxide. This dry mixture is then wetted with between about 2.5 and about 12.5 parts by weight, respectively, of an aqueous magnesium chloride solution which contains between about 18% and about 35% by weight, preferably between about 18% and about 22% by weight of magnesium chloride. If dry magnesium chloride salt is used instead of an aqueous solution, water is added to the mixture in sufficient amount to obtain a solution containing between about 18% and about 22% by weight of magnesium chloride. After thorough mixing, the material is poured into a form and allowed to harden. The amount of magnesium oxychloride used depends upon the degree of hardness desired in the salt blocks. Although the above indicated amounts are preferred, amounts outside of the above indicated range may be used in practicing the instant process.

Salt in any granular form may be used in practicing the instant invention. In the preferred embodiment, coarse granular salt from any convenient source, for example, salt from potash tabling processes, and having a mesh size of between about 4 and about 20, is used.

Any aqueous solution containing at least about 18% by weight of magnesium chloride may be used in the instant process. In the preferred embodiment, between about 2 and 3 parts by weight of aqueous magnesium chloride solution per part of magnesium oxide is used. The solution contains preferably 18% and about 22% by weight of magnesium chloride.

In another embodiment, an aqueous end liquor rejected from a process for producing potassium sulfate, and containing between about 20% and about 25% by weight of magnesium chloride, is used.

As a specific example of the process, the following serves merely as an illustration and it is not intended that the scope of the invention be limited thereto.

*Example*

About 1,000 parts by weight of coarse granular salt from a potash tabling process was mixed with about 50 parts by weight of calcined magnesite. About 125 parts by weight of an aqueous liquor (specific gravity about 1.2), containing between about 20% and about 25% by weight of magnesium chloride, was added to the above mixture. After thorough mixing the material was poured into a form and allowed to harden for a few hours. The blocks were hard and durable.

Having thus fully described the character of the invention, what is desired to be claimed and protected by Letters Patent is:

1. A process for preparing an animal salt block which comprises mixing 100 parts by weight of salt with between about 1.25 and about 5.0 parts by weight of magnesium oxide, adding to the resulting mixture sufficient amounts of magnesium chloride and water so that the resulting mixture will contain between about 2 and about 3 parts by weight of between about 18% and about 22% aqueous magnesium chloride solution per part of magnesium oxide, and allowing the mixture to harden in block form.

2. A process for preparing an animal salt block which comprises mixing 100 parts by weight of salt with between about 1.25 and about 5.0 parts by weight of magnesium oxide, adding to the resulting mixture between about 2.5 and about 12.5 parts by weight, respectively, of an aqueous solution containing between about 18% and about 22% of magnesium chloride, and allowing the mixture to harden in block form.

3. A process for preparing an animal salt block which comprises mixing 100 parts by weight of salt with between about 1.25 and about 5.0 parts by weight of magnesium oxide, adding to the resulting mixture between about 2 and about 3 parts by weight per part of magnesium oxide of an aqueous solution containing between about 18% and about 22% of magnesium chloride, and allowing the mixture to harden in block form.

4. A process for preparing animal salt blocks which comprises mixing salt with at least a sufficient amount of magnesium oxide, magnesium chloride and water to bind the salt upon hardening in block form.

5. An animal salt block comprising salt and an amount of magnesium oxychloride at least sufficient to bind the salt in block form.

6. An animal salt block containing salt and between about 3.5 and about 7.5 parts by weight of magnesium oxychloride per 100 parts by weight of salt.

WILLIAM B. DANCY.

REFERENCES CITED

The following references are of record in the file of this patent:

UNITED STATES PATENTS

| Number | Name | Date |
|--------|------|------|
| 672,672 | Green | July 20, 1900 |
| 2,489,758 | Dunn | Nov. 29, 1949 |